Jan. 2, 1968   J. A. TILLOTSON III, ET AL   3,360,873
ELECTRONIC DEVICE AND METHOD FOR TESTING AND TEACHING
Original Filed Dec. 6, 1962   2 Sheets-Sheet 1

INVENTORS
JAMES A. TILLOTSON, III
JEROME C. MEYER
BY
ATTORNEY

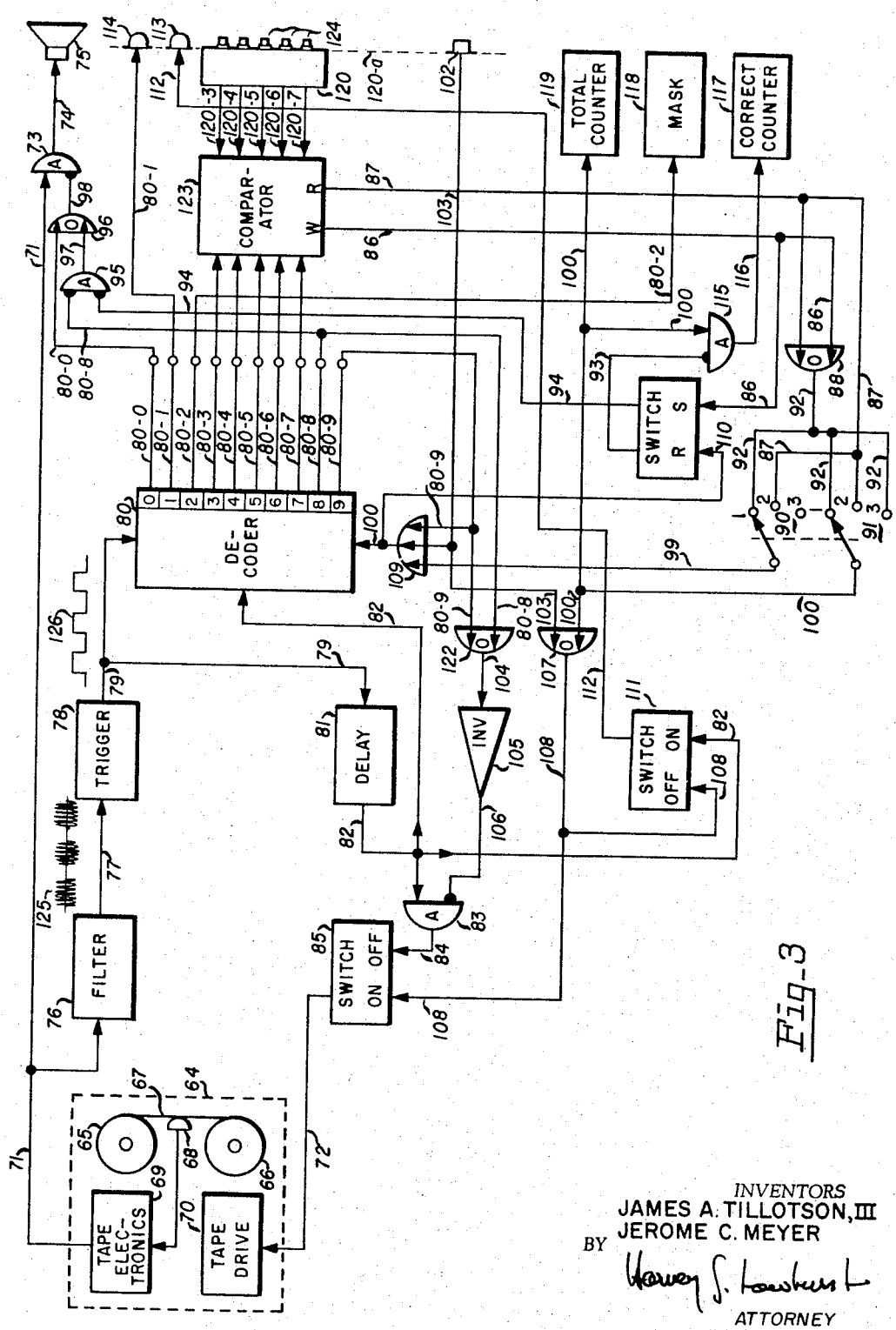

United States Patent Office 3,360,873
Patented Jan. 2, 1968

1

3,360,873
ELECTRONIC DEVICE AND METHOD FOR
TESTING AND TEACHING
James A. Tillotson III, 1415 Ben Roe Ave., and Jerome
C. Meyer, 1512 Ben Roe Drive, both of Los Altos,
Calif. 94022
Continuation of application Ser. No. 242,706, Dec. 6,
1962, now Patent No. 3,210,864, dated Oct. 12, 1965.
This application Oct. 1, 1965, Ser. No. 492,140
14 Claims. (Cl. 35—9)

ABSTRACT OF THE DISCLOSURE

Preparing and recording a teaching program on magnetic tape in which verbal material, representing questions or statements addressed to a student, are recorded as audio signals and coded material, representing anwers to the immediately preceding verbal material, are recorded immediately following the verbal material as pulse trains of equispaced, identical pulses. The number of pulses in a pulse train represent the answer to the preceding verbal material and the distance between the commencement of the coded material and the commencement of the next succeeding verbal material is at all times maintained greater than a selected minimum distance which is smaller than a given time delay utilized to separate successive verbal material and sufficiently great to allow recording of a pulse train including a maximum number of pulses.

This is a continuation of application Ser. No. 242,706, filed Dec. 6, 1962, now U.S. Patent No. 3,210,864.

This invention relates to electronic devices and a method for the testing and teaching of persons, and more particularly to a device for: electronically recording a selected testing or teaching program including questions together with coded answers to the questions; electronically reproducing the testing or teaching program for audible or pictorial reception by a person to be tested or taught who is provided with multiple choice answers, and means for selecting one of the answers to a given question and for coding the selected answer for reception by the device; and comparing the coded answer given by the person under test or training with the answer coded during recording of the program and for following a selected program in accordance with the result of such comparison.

With increasing specialization in business, in industry, and in education, the need for individual testing and particularly training of employees, customers, students and the like becomes increasingly more important. Heretofore the testing and training of such persons, whether they be employees, applicants, trainees or students, required a training staff to repetitiously teach the same instructional material to individual after individual and group after group. As the field of industrial and educational specialization becomes more narrow and the number of persons required for the various specialties becomes larger, the cost of testing and training by trained personnel has sharply risen and trained personnel to perform such tasks have become increasingly more difficult to find.

For example, one of the incidents to the sale of a complicated new product, such as for example a new office calculator, is the problem of training the customers in the proper operation, use, and maintenance thereof. Heretofore, industry had to provide such customer training by organizing a special field service staff which is, of course, very costly to maintain. Furthermore, unless such a field service staff is overstaffed, a member of this special department may not be immediately available to train or service a customer upon short notice, resulting in dissatisfaction of the customer. The electronic testing and teaching device of this invention makes it possible to test and train the customer by use of special programs carefully tailored to their needs, without the need of human instructors.

Also, for the hiring of employees in connection with the performance of specified jobs or for the operation of specified machines, it has been necessary heretofore for industry to maintain a staff of highly trained interviewers. No matter how competent and highly trained these interviewers were, they could hardly be expected to have an intimate knowledge of the performance of each job of the operation of each machine for which they were to hire personnel. Accordingly, personnel can and are today often hired without an adequate test of their qualifications for the job. As a result thereof there have been instances in which employees not competently trained were hired with the resulting increase of overhead and decrease of overall efficiency. And even in the case of attempting highly selective hiring by specialized interviewers, the cost of maintaining such interviewers, particularly for smaller industrial concerns, is often prohibitive or unrealistic.

The above two examples, selected at random from many others which are common occurrences in today's industry, clearly show the need for accurate, foolproof and automatic machines for testing and training individuals utilizing highly specialized programs carefully selected for the skills to be tested or taught. In this manner a specialist in the particular skill to be programmed for testing or teaching may assist the training personnel in the preparation of such specialized programs.

In certain instances, very specialized programs may be required in a particular industry so that provisions to prepare one's own programs are desirable. Of the utmost importance is therefore the requirement that programs be simple to prepare and easy to modify. Whether or not the program is bought or made by one's own staff, such programs should be reusable over and over again and the devices which use these programs for individual testing and teaching should be fully automatic and either test or teach for specialized skills or general knowledge. Further, such devices should provide an output which gives test or teaching scores so that the qualifications or degree of proficiency can be measured, and if necessary, fully evaluated.

Electronic testing and teaching machines attempting to solve the above indicated problems have appeared heretofore from time to time but each one has been found wanting in some respects. Certain of the prior art machines were capable of performing only the testing function and this only with the aid of pencil and paper. Other prior art machines of the electronic type for individual operation were not foolproof and permitted tampering with the results after a person had completed a program. Still other electronic testing and teaching machines have been found of very limited application in that the method of testing or teaching was not sufficiently rigidly programmed to actually test or train a person. None of the prior art attempts of providing a testing or teaching machine have solved the problem of fully automating the same so that no individual need be in attendance or that answers are immediately and electronically checked and recorded.

It is therefore a primary object of this invention to provide a fully automatic device for the testing and training of persons in any field whether it be commercial, industrial, or educational.

It is another object of this invention to provide a fully automatic device capable of training employees for specified jobs without the need for a trained individual in attendance.

It is a further object of this invention to provide a foolproof, electronic fully automatic device of the testing and teaching type having several modes of operation whereby persons may be either tested or trained or both in accordance with a preselected and changeable program.

It is also an object of this invention to provide a teaching device which is very simple to program so that "in-house" programs can be prepared at minimum cost.

It is still another object of this invention to provide a testing and training device which readily accepts selected test or instructional material for playback to a person under test or training who is forced to respond to each individual question of the material propounded before the device will advance to the next question. Additionally, the device is desired to have selected modes of operation and either advances to the next question independent of whether the correct response was received, or requires a correct response prior to advancing, or responds to a wrong response by automatically providing additional or reinforcing material pointing to what the proper response should have been before advancing to the next question.

It is a still further object of this invention to provide testing and training devices which compute the sum total of the correct responses and the total responses without giving any indication of the score to the person under test or training.

It is also an object of this invention to provide a testing and teaching machine for use with a recorded program which can be repeated numerous times and which may be used in connection with an answer booklet or other visual devices such as slides, films and the like for displaying multiple choice answers, which are also capable of many repeated uses.

It is also an object of this invention to provide a device of the testing and teaching type which is fully automatic, economical, foolproof and capable of testing and teaching in accordance with exchangeable duplicating and storable programs which can be developed by experts for repeated use.

It is also a still further object of this invention to provide a device of the testing and teaching type which utilizes a recorded program including coded answers and control signals superimposed on the audio storage means.

Briefly, in the preferred embodiment of this invention, questions are voice recorded on a magnetic tape or any other suitable record storage means, each followed by a pulse coded number which represents the number of the correct answer of numbered multiple choice answers shown the person under test or training. The recorded tape, which is the testing or teaching program, is played back for audible reproduction of the question by a magnetic playback device which is constructed to stop after each question and to wait for the person to select an answer from the multiple choice answer shown him. The device also detects, decodes and stores the correct pulse coded answer.

A coder is provided in the form of a response panel which is actuated by the person under test or training and which is compared with the stored answer. In accordance with the particular mode of operation desired, the device of this invention first records whether or not the person selected the right answer and thereafter either advances to the next question, or gives the person a second chance to select the correct answer, or supplies the person with additional informative material so he can learn the correct answer. For the last mode of operation, such illustrative material is voice recorded on the magnetic tape after the coded answer and the device is provided with means of advancing the tape to reproduce such material in case a wrong answer is given and to omit such material in case the correct answer is given.

Other objects and a better understanding of the invention may be had by reference to the following description, taken in conjunction with the accompanying drawings, in which:

FIG. 3 is a schematic system diagram showing the playback and the general control system of the testing and teaching device of this invention.

Figure 1:
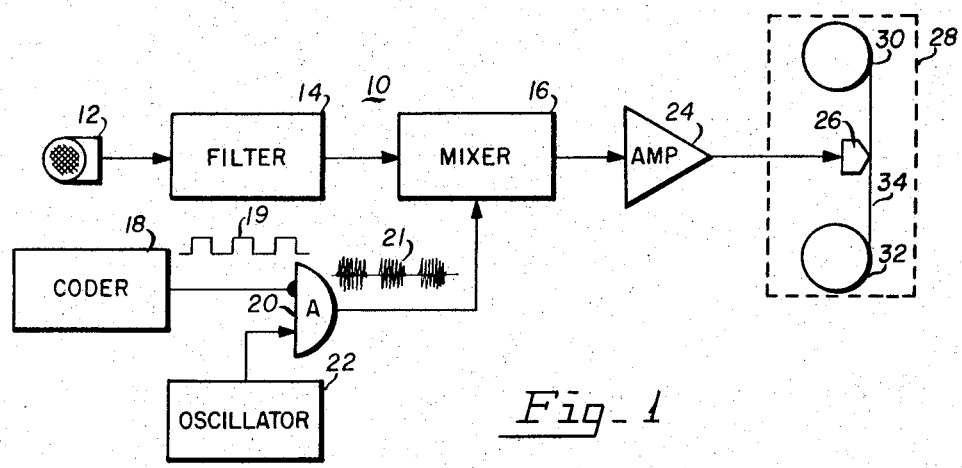
FIG. 1 is a schematic system diagram of the recorder portion of the testing and training device of this invention.

In order to more fully understand the ensuing detailed description of the drawing and particularly the method employed in testing and teaching humans in accordance with this invention, the following general discussion of the nature of the testing and teaching program and the response expected of the person being tested and trained, as well as the coding scheme and various methods of operation, is now offered.

Generally speaking, the preferred method of testing and teaching a person in accordance with this invention comprises asking the person a question, registering the answer and taking some action in accordance with the answer registered. The person is asked the question either audibly, such as for example through a loud speaker, or visually such as, for example, by means of a television screen or slide or movie projector. In other applications of interrogating, the question might comprise a combination of both vision and sound, such as may be accomplished by a motion picture with a sound track. In any event, the person to be tested or instructed is interrogated with questions which are sequentially numbered and which may be preceded by a lecture in case the primary purpose, to which the device of this invention is put, is to teach.

The person to be tested or trained is also provided with a set of multiple choice answers, usually printed on paper sheets or cards, which are keyed to the numbered questions he is asked. Instead of printing, the answer may, of course, be projected for viewing or may be audibly presented for listening. In the simplest embodiment of the device of this invention, the person is simply handed a sheet of paper with carefully numbered sets of multiple choice answers from which he selects the one that he thinks is the correct one. Each set of multiple choice answers in addition to being keyed to a question, has a number or letter assigned to it so that selection of the answer may be made by such letter or number.

Preferably, the question is not printed on the multiple choice answer sheet since in certain test programs information may be gleaned by the person if he has all the questions and answers before him. It has been found that more objective testing and teaching results when the student has only one question before him at a time and has no knowledge of future questions. Past questions, in a testing or teaching program of this nature, are soon forgotten so that practically speaking, the person being tested or trained is confronted only with the single question placed before him. And in any case, if the object is to teach, it may be beneficial for the student to exercise recall since this act of concentration on on the subject matter results in learning.

There is a further reason why questions should not be written down and be followed by the multiple choice answers. In certain teaching applications of the device of this invention, the person is first given instructional material which he is to learn. If he has the qustion later to be asked in front of him at the time that he listens to the instruction material, it is quite possible that the might mark off the proper answers given in the instructional material and is thereby able to evade a fair and objective test of the material presented to him. It must be remembered that one of the objects of this invention is to provide a fully automatic and foolproof device which requires no supervision and in which the student is initially issued all material necessary for receiving training or for taking tests. There will be no necessity for a proctor to watch over him to assure that he does not cheat.

The embodiment of the invention to be described hereinafter utilizes up to a choice of five different answers to each question. By way of example, the device of this invention might first give a short lecture on history to the person and thereafter interrogate him as follows: "Question No. 3 is: Who was the first president of the United States?" On his answer sheet under Question No. 3 he might be confronted with the following choice: (a) George Washington, (b) Dwight Eisenhower, (c) Franklin D. Roosevelt, (d) Herbert Hoover, (e) Calvin Coolidge. From these five answers he must make his choice and push an appropriate button from five buttons numbered (a), (b), (c), (d), (e), before the device proceeds to the next question.

If the student pushes or depresses the right button, that is, gives the correct answer, the teaching and testing device of this invention will automatically advance to the next question, announce or depict the same in a suitable manner and indicate that it requires an answer. In this manner the test or training proceeds until completed. However, if the student depresses the wrong button, i.e., gives an incorrect answer, the device of this invention may be set initially to operate in one of three different modes of response to an incorrect answer depending on the primary purpose for which the device is to be used. The three modes of operation will be respectively referred to as the Test Mode, Teach Mode No. 1, and Teach Mode No. 2.

In the Test Mode, the device of this invention is so arranged that every time an answer is made, and regardless of whether the answer is right or wrong, the device proceeds to the next question immediately. The device is also provided with a correct counter, preferably hidden under a releasable mask to prevent the person being tested from learning his score. Every time the person being tested gives a correct answer, the correct counter is advanced and every time an incorrect answer is given the correct counter remains stationary. In this manner the person to be tested has no knowledge of how well he is doing. This mode may also be utilized to teach a student by preceding the next question with a statement of the correct answer. Also, there may be provided a total counter with advances every time a question is asked and gives the student an opportunity to check which question he is on.

The Teach Mode No. 1 differs from the Test Mode in that the next question is only asked after a correct answer is made by the person being taught. In this manner the person being trained will know which one is the correct answer since only the correct answer will advance the program to the next question. As in the Test Mode, the total counter advances every time a question is asked and the correct counter is so set that it is advanced only if the person being taught chooses the correctc answer on his first selection.

In the Teach Mode No. 2 the device of this invention continues from question to question regardless of whether the answer selected by the person being taught is wrong or right. However, if the person has given an incorrect answer, special reinforcing material is given to the student carefully explaining to him what answers he should have made and why. Such reinforcing material may be a statement such as: "It was George Washington. Remember he was the country's primary leader after the American Revolution ended in 1782. He presided at the Constitutional Convention in 1787 and was elected president by a unanimous vote of the electional college in 1789." In case the student selected the correct answer, the reinforcing material is omitted and the correct counter advances. The total counter advances each time a question is asked, the same as in the previous two modes.

Referring now to the drawing, and particularly to FIG. 1 thereof, there is shown a preferred embodiment of the portion of the device of this invention for recording the testing or teaching program upon a record member such as magnetic tape. This recording portion, indicated generally as 10, comprises a microphone 12 connected through a suitable filter 14 to a conventional mixer 16. Filter 14 may either be a band-elimination filter constructed to eliminate a narrow band of audio frequencies centered about a selected code oscillator signal frequency or a low-pass filter having a cut-off frequency just below the selected code oscillator signal frequency.

There is also provided a coder 18 which upon being actuated generates a selected number of substantially uniformly spaced, rectangular output pulses as generally indicated at 19. Coder 18 may take the form of either a conventional telephone dialer capable of selectively providing anywhere from a single to ten or more consecutive, equally spaced output pulses or a conventional serial digital pulse coder such as a shift register or the like.

As will be explained hereinafter, the function of coder 18 is to provide a selected number of short, uniformly spaced output pulses, the maximum number in the embodiment to be described being nine. As will also become more clearly understood in the ensuing description, instead of using a code of nine it is likewise within the contemplation of this invention of using lower or higher code numbers, should the need for reduced or additional programming arise. Output pulses 19 from coder 18 are applied, as the enabling signal, to a conventional AND gate 20 for gating the output signal from a code oscillator 22.

The frequency of the signal provided by code oscillator 22 is intimately related to filter 14 as has already been stated. In fact, filter 14 is constructed to eliminate from the audio signal, generated by microphone 12, a narrow frequency band centered about the frequency of code oscillator 22.

The gated code oscillator signal passed by AND gate 20 is also applied to mixer 16 so that the output of mixer 16 comprises the audio signal from microphone 12 from which a narrow frequency band, centered about the code oscillator frequency, has been eliminated by filter 14 and the code oscillator signal suitably gated by AND circuit 20. This signal is also referred to as the composite signal being made up of a filtered audio signal and a gated code oscillator signal.

The composite signal is suitably amplified by amplifier 24 and applied to a magnetic recording head 26 of a tape recorder 28. Tape recorder 28 may be of conventional design including, in addition to magnetic head 26, a tape supply reel 30 and a tape take-up reel 32 for storing a magnetic recording medium such as a tape 34, and suitable tape drive means for driving tape 34 at a constant speed past magnetic head 26.

In recording a testing or teaching program upon a tape by means of recording portion 10, a distinction must be made between the Test Mode and Teach Mode No. 1 on the one hand, and the Teach Mode No. 2 on the other hand. Supposing the program to be recorded relates to the general knowledge of a person in history and question No. 3 of the program relates to the identity of the first president of the U.S. The person preparing the program will then speak into microphone 12 and say "Question No. 3 is: Who was the first president of the United States?" This question is recorded upon tape 34 and shows up as a recorded audio signal as shown at 40, FIG. 4A. Of course, signal 40 excludes the audio frequencies eliminated by filter 14 but since such eliminated frequencies fall within a rather narrow band there will not be a noticeable deterioration of the signal and the reproducible characteristics of audio signal 40 are not materially affected. After the end of the question, the person preparing the recorded program actuates coder 18 to provide a selected number of code pulses, such as 19, which enable AND gate 20 to permit gated code oscillator signals to be passed, via mixer 16, to tape 34.

For reasons which will become better understood in connection with the explanation of the portion of the device shown in FIG. 3, the five possible answers to any question, that is (a), (b), (c), (d) and (e), are respectively coded by three, four, five, six and seven successive code pulses. Since the correct answer to Question No. (3) is answer (a) the preparer of the program will actuate coder 18 in such a manner that the same provides three successive pulses as shown at 19. These pulses open AND gate 20 to pass these gated code oscillator signals to mixer 16 and to tape 34. These three code pulses appear on tape 34 as is shown at 41, FIG. 4A.

Selection of the proper code oscillator frequency depends, to some extent, on the quality of the recorder. For example, for inexpensive recorders, which do not have very high fidelity, a relatively low code oscillator frequency is desired since otherwise the roll-off is too great. Also, to achieve the greatest economy in the use of tape, a low tape speed is desired which again decreases the fidelity of the output signal so that a low oscillator frequency is best. As a practical matter a code oscillator frequency of 3,600 cycles per second has been found eminently satisfactory with a tape speed of 3¾ inches per second. Accordingly, filter 14 is designed in such a manner that it does not pass frequencies of 3,600 cycles per second. Good results have been provided with a filter, either band pass or low pass, which provides an attenuation of 20 db at the code oscillator frequency.

Figure 4A:
FIGS. 4a and 4b are wave form diagrams illustrating the recorded question and the code utilized in operating the device of this invention in several training modes.

After recording three successive code pulses to signify that the first of the five multiple choice answers is the correct one, the next question (Question No. 4) is recorded as shown at 42, FIG. 4A, together with the gated code oscillator signal which is illustrated as seven consecutive pulses at 43, indicating that answer (e) is the correct one for Question No. 4.

The above-described operation of recording portion 10 is proper for recording a program to be used in the Test Mode and the Teach Mode No. 1. In case the program to be prepared is to be used for the Teach Mode No. 1, it has been found convenient to start the recorded program with a lecture which is then followed by questions and coded answers such as indicated at 40 and 41, FIG. 4A.

Figure 4B:
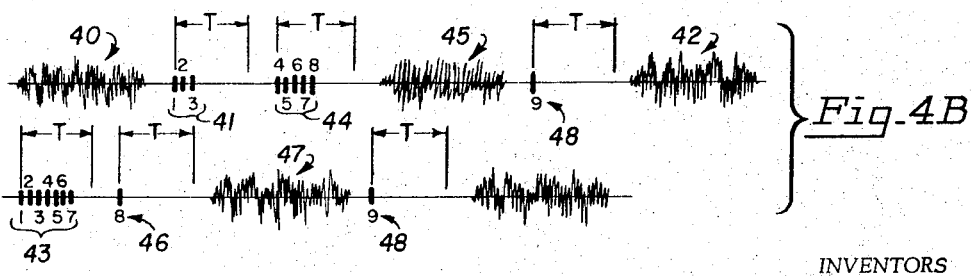

In case the program to be recorded is to be used for operation in the Teach Mode No. 2, the same procedure as outlined above is followed except that after recording the question 40 and the coded answer 41 as shown in FIG. 4B, and after a selected time interval has elapsed, additional coded pulses are recorded as shown at 44 in FIG. 4B. The number of additional pulses recorded depends on the number of coded pulses already on the tape (such as indicated at 41) and is selected to bring the total number of coded pulses to eight. The significance of a total count of successive pulses equal to eight will become better understood in connection with the description of FIG. 3.

For the proper operation of this invention it is necessary that there be a proper time interval between the commencement of the first group of pulses such as 41 and the commencement of the second group of pulses such as 44, FIG. 4B. The proper time interval must be greater than the time occupied by 9 consecutive code pulses so that the reproducing portion of this invention can function properly. The time interval is generally selected to be greater by at least 20% of the time occupied by maximum number of coded pulses which may be generated by coder 18 and which is shown by reference character T in FIG. 4B.

Coder 18 may incorporate a suitable time delay which is actuated automatically at the time the code pulses for the correct answer are actuated and which may light up a signal after the expiration of the selected time delay. As soon as the delay signal appears, the person recording the program may actuate the additional group of code pulses to bring the total number of code pulses to eight. Immediately following the eighth code pulse, as shown at 44, FIG. 4B, reinforcing material is introduced into microphone 12 for recording on tape 34, as indicated at 45. This reinforcing material is then immediately followed by an additional single pulse, shown at 46, which brings the total number of pulses following a question to nine.

Thereafter, the next question (Question 4) as shown at 42 is spoken into microphone 12 and coder 18 is actuated to provide the proper number of code pulses as shown at 43 just as was explained in connection with FIG. 4A. Coded pulse group 43 is followed by a single pulse 46 after the proper time interval to bring the total number of code pulses following Question No. 4 to eight as before. Thereafter, additional reinforcing material, indicated at 47 and relating to Question No. 4, is spoken into microphone 12. Reinforcing material 47 is followed by a single code pulse, indicated at 48, which brings the total number of code pulses following question 42 to nine. Thereafter, Question No. 5 is recorded.

Figure 2:
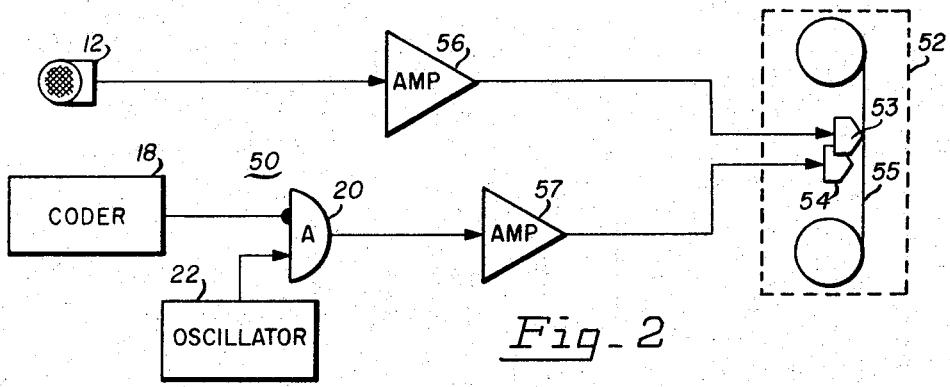
FIG. 2 is a schematic system diagram of an alternate embodiment of the recorder portion of this invention utilizing a dual track magnetic head.

Referring now to FIG. 2 there is shown an alternate embodiment of a program recording portion 50 comprising a microphone 12, a coder 18, a code oscillator 22, and an AND gate 20 which may be alike in all respects to those shown and described in FIG. 1. A tape recorder 52 is provided, which differs from tape recorder 20 in that it includes two magnetic heads respectively designated as 53 and 54 for recording signals upon a tape 55 in customary manner.

The signal from microphone 12 is applied, through an amplifier 56, directly to magnetic head 53 and the gated code oscillator signal from AND gate 20 is applied, via an amplifier 57, to magnetic head 54. Basically, the operation of the program coding portion 50 of this invention is very similar to the one explained in connection with program coding portion 10. The main difference is that instead of a single channel, a dual channel device is made use of, thereby eliminating filter 14 and mixer 16 but adding an extra amplifier 57.

Referring now to FIG. 3, there is shown an illustrative embodiment of the teaching device of this invention suitable for operating in the three modes heretofore described. A tape transport, generally indicated as 64, includes a tape supply reel 65 and a take-up reel 66 for storing a tape 67 upon which the testing or teaching program has been recorded as described hereinabove. A magnetic head 68 for sensing the composite signal is connected to suitable output circuits and playback amplifiers which are generally indicated as 69. Tape 67 is driven past magnetic head 68 by means of a conventional tape drive, such as pinch rollers or other suitable means, which is indicated generally as 70. Tape transport 64 has an output lead 71 coupled to output circuits 69 for applying the composite output signal to the utilization devices to be described and an input lead 72 coupled to drive 70 for driving tape 67 in accordance with the operational program.

The composite signal is applied, via an output lead 71, a conventional AND gate 73, and a lead 74, to a loud speaker 75 or similar sound reproducing means such as earphones. The composite signal is also applied, via lead 71 to the input terminal of a band pass or high pass filter 76 which is constructed to eliminate the audio signal portion therefrom and to only pass the gated code oscillator signal. The gated code oscillator signal is applied, through lead 77, to a conventional trigger circuit 78 which may include an AM detector and a pulse shaper such as, for example, a conventional Schmidt trigger circuit. Trigger circuit 78 is triggered by the leading edge of each gated code oscillator signal pulse and is constructed to provide an output pulse of selected amplitude and duration for each coded oscillator signal pulse. The shaped output pulses from trigger 78 are applied via lead 79, to a decoder 80 and to a delay circuit 81.

Decoder 80 is basically a "serial to parallel" converter such as, for example, a conventional stepping switch which advances by one step with the application of each successive pulse. The particular coder 80, shown in FIG. 3, is provided with ten positions numbered consecutively from 0 to 9. As will become better understood hereinafter, the number of output positions of decoder 80 depends entirely on the particular logic and mode of operation desired and may be decreased or increased accordingly. Ten position decoder 80 is eminently suitable for operating the device of this invention in the TEST MODE, TEACH MODE NO. 1 and TEACH MODE NO. 2. The various output positions of decoder 80 are designated by reference character 80 followed by a number indicative of the switch position.

Delay 81 may be selected in the form of a conventional monostable multivibrator which is triggered on the leading edge of the first shaped pulse applied and which returns to its quiescent position after a selected time interval. As has already been stated in connection with the explanation of TEACH MODE NO. 2, the commencement of the second group of pulses such as group 44, FIG. 4B, must be delayed with respect to the commencement of the first group of pulses such as by an interval greater than nine consecutive pulses, i.e., an interval T. Accordingly, delay 81 is so set that it returns to its quiescent position after a period of time which is longer than that taken by 9 consecutive pulses in the embodiment shown, or generally which is longer than the time necessary to advance decoder 80 to the last position. It has been found that, if a telephone dialer is used as a coder, a delay of about 1 second is entirely satisfactory.

Output lead 82 of delay 81 applies the trailing edge of the delayed pulse to the input circuit of a conventional AND gate 83, to decoder 80, and to the ON terminal of a memory device such as switch means 111. The delay pulse on lead 82 and gated by AND circuit 83 is applied, via gate output lead 84, to the OFF terminal of a switch means 85 connected via lead 72 to control tape drive 70. The delayed pulse applied to decoder 80 is also utilized to enable output circuits 1 to 9 of decoder 80 which is so constructed that prior to the application of the delayed pulse all output circuits except circuit 0 (home position) are disabled. One conventional method of such disabling means is to provide AND gates or the like in each coder output circuit except the first output circuit and utilize lead 82 as enabling signal lead.

Switch means 111, turned on by delay 81, has its output lead 112 connected to a lamp 113 on a response panel, indicated by broken line 120a, which shows that delay 81 has returned to its quiescent position and that a response may now be received.

Decoder output position 80-0, the home position, is connected to the input circuit of a conventional OR gate 96 whose output circuit is connected, via lead 98, to the input circuit of AND gate 73 and applies to the enabling signal thereto. Decoder output position 80-8 is connected to the input circuit of a conventional AND gate 95 and also to the input circuit of a conventional OR gate 122. Decoder output position 80-9 is also connected to the input circuit of conventional OR gate 122 and to the input circuit of a conventional triple input OR gate 109 which in turn has an output circuit connected, via output lead 110, to the rest terminal of decoder 80 and which resets decoder 80 to its home position 80-0.

OR gate 122 has its output circuit connected, via a lead 104, to a conventional inverter 105. An inverter output lead 106 is connected to the input circuit of conventional AND gate 83 which applies its gated output signal to the OFF terminal of switch means 85. Decoder output position 80-1 is connected directly to a response panel lamp 114 on response panel 120a which lights up whenever decoder 80 comes to rest on this output position, an indication of the end of the tape and coded by a single gated code oscillation pulse. Decoder output position 80-2 is directly connected to a mask 118 covering the face of a correct counter 117 which retracts the mask whenever decoder 80 comes to rest in this output position and coded by two gated code oscillator pulses.

Decoder output positions 80-3, 80-4, 80-5, 80-6 and 80-7 are applied respectively to the input terminals of a comparator 123. Comparator 123 may take the form a logic circuit which is responsive to the output position of decoder 80 and which compares certain input information, as will be explained, with the decoder position to provide output signals indicative of certain combinations.

There is also provided response circuit 120 which includes 5 response buttons 124, each one of which is associated with a different one of the multiple choice answers. Response circuit 120 is provided with five output leads 120-3, 120-4, 120-5, 120-6 and 120-7, each associated with a different response button 124 and each applied to the input terminals of comparator 80.

In the embodiment of this invention to be described, the presence of output signals on both comparator output leads 86 and 87 will have the same effect as an output signal on output lead 86 only since it takes precedence by actuating circuits which prevent the output signal on lead 87 from being acted upon. The reason for this is to prevent a student from cheating the machine by pushing more than one response button at the same time. The same effect could be realized by utilizing the output signal on line 86 to close a gate through which the output signal of lead 87 had to pass to the utilization circuits.

A suitable comparator 80 may include two toggles such as bistable multivibrators, one is set by the student as he depresses the response button corresponding to the correct anwer and the other is set by the student if he depresses any response button other than the one corresponding to the correct answer. For example, if decoder output position 80-6 is high and response button 120-6 is depressed, the logic is arranged, by a matrix network or otherwise, to set one toggle. If any other response button is depressed, the other toggle is set to provide an output signal on lead 86. Such logical network is readily constructed from five diodes and a five input OR gate by other conventional logic arrangement as well known to those skilled in the art.

Output line or lead 87 is applied to the input circuit of a conventional OR gate 88 and to the second switch terminals of a pair of ganged three-position mode switches respectively designated by reference mode switches 90 and 91 to determine the particular mode in which the device of this invention is to be operated, position 1 corresponding to the TEST MODE, position 2 corresponding to the TEACH MODE NO. 1, and position 3 corresponding to TEACH MODE NO. 2.

Output line 86 is also connected to the input circuit of OR gate 88 and to the set terminal of a switch means 89 which may be of the form of a conventional bistable multivibrator and which is set by an incorrect answer. OR gate 88 has its output circuit connected, via output lead 92, to position 1 of mode switch 90 and to positions 1 and 3 of mode switch 91.

The output terminal of switch 90 is connected, through lead 99, to the input circuit of OR gate 109 and is utilized to apply a reset pulse to decoder 80. Output terminal of switch 91 is connected, through lead 100, to a total counter 119, to the input circuit of a conventional AND gate 115 and to the input circuit of conventional OR gate 107 to fulfill various operations which will hereinafter be explained.

A reset response panel button 102 is also connected, via lead 103, to the input circuit of OR gate 107. The output circuit of OR gate 107 is connected, via lead 108, to the ON terminal of switch means 85 and to the OFF terminal of switch means 111. Also, one of the output terminals of switch means 89 is connected via lead 93 to enable AND gate 115 whose output circuit is connected, through lead 116, to a correct counter 117. The other output terminal of switch means 89 which provides the complement is connected, via lead 94, to apply an enabling signal to AND gate 95.

The invention can be best understood by reference to the following description of its operation. As heretofore stated the device of FIG. 3 may be operated in one of three different modes designated respectively as the TEST MODE, TEACH MODE NO. 1 and TEACH MODE NO. 2. Operation in the different modes is provided by means of switching mode switches 90 and 91 as heretofore stated.

Referring now to the operation of this invention common to all modes, decoder 80 is initially in the 80–0 position or home position so that lead 80–0 is high and applies an enabling signal, through OR gate 96 and lead 98 to AND gate 73. Accordingly, AND gate 73 is always open when decoder 80 is in its home position.

As soon as tape transport 64 is actuated, such as by depressing rest button 102 which turns on switch means 85 to start tape drive 70, tape 76 is advanced to provide an audio signal on tape recorder output lead such as diagrammatically indicated at 40, FIG. 4A. Since AND gate 73 is open at the instant, the audio signal passes to loud speaker 75 for audible reproduction. The audio signal is also applied to filter 76 which is constructed to prevent the same from passing there through to trigger 78.

After the introductory interval or question has been audibly reproduced, tape 67 continues to be driven past magnetic head 68 which now senses the gated code oscillator signals shown at 125. These coded signals are passed by filter 76 and applied to trigger 78 which forms the pulses shown at 126 from the leading edge of the code signals. Decoder 80 is so constructed that the leading edge of each pulse, such as the one shown at 126, advances the position of the decoder by one step. Accordingly, as soon as the leading edge of the first pulse of the group of pulses 126 is applied to decoder 80, it advances its position so that output position 80–0 immediately becomes low and thereby removes the gate enabling signal from lead 98 thereby closing gate 73 and preventing any of the code oscillator signals from reaching loud speaker 75. Of course, at that time leads 80–8 and 94 are low also.

At the same time, the leading edge of the first pulse 126 is applied to delay means 81 to trigger the same. Since delay 81 is constructed to return to its normal position after a time T sufficient to permit at least 9 consecutive pulses to be received, no output signal is provided on decoder gating lead 82 until the end of the delay. Decoder 80 is, as has already been mentioned, so constructed that unless decoder enabling lead 82 is high no output signals are provided from the various decoder output circuits 1 to 9.

As soon as delay means 81 returns to its quiescent position, it provides an enabling signal on lead 82 opening output circuits 1 to 9 of decoder 80. At the same time it provides an output signal which is applied through AND gate 83 which is open through inverter 105 unless decoder 80 comes to rest either in position 8 or 9. Since, as hereinabove explained, positions 8 and 9 are only used in connection with operating the device of this invention in the TEACH MODE NO. 2, AND gate 83 is normally opened so that at the end of the delay period T, a signal is applied to switch means 85 which turns off tape drive 70.

The signal from delay 81 is also applied to switch means 111 turning the same on thereby actuating response panel lamp 113 which lights up to indicate to the student that he should now answer. In summary therefore, after the time determined by delay 81, decoder 80 has reached its final position, tape transport 64 is turned off, the decoder output circuits are enabled to set comparator 123 and switch 111 is turned on indicating that the student should now respond.

The hereinabove described operation of the device of FIG. 3 is common to all three modes of operation and puts this device in condition for the student to make a selection of the multiple choice answers. It might also be stated that in the particular embodiment presented in FIG. 3, the second position (80–1) of decoder 80 indicates the end of the tape which causes response panel lamp 114 to light up. The third position (80–2) of decoder 80 is reserved for removing mask 118 from the correct counter 117 and is usually provided just before the end of the tape is reached. The next five decoder positions (80–3, 80–4, 80–5, 80–6 and 80–7) are reserved for the coded answers. The two last decoder positions will be explained hereinafter.

Assuming that the proper answer to the question is (c), i.e., the third choice of the multiple answer, the five code bursts would have advanced decoder 80 to the fifth position to enable the appropriate toggle in comparator 123 to be set by the third response button. Consequently, if the student presses the button which applies the signal to lead 120–5 he has a correct answer and generates a signal on lead 87. Any other response panel button will provide an incorrect answer to generate a signal on lead 86.

Referring now particularly to the TEST MODE in which mode switches 90 and 91 are in their first position and assuming that a correct answer is given, this correct answer generates an output signal on lead 87 which is applied to OR gate 88 and passes there through to both switch output leads 99 and 100. Output lead 99 applies this signal through OR gate 109 and lead 110 to the reset terminal of decoder 80 to reset the same to its home position. The signal on output lead 100 is applied to total counter 119 which advances by one step and is also applied through AND gate 115 and 116 to correct counter 117 which advances by one step only if a correct response was made on the first try.

Correct counter gate 115 controls correct counter 117 in the following manner. Each reset pulse resets switch means 89 so that lead 93 is high and provides a gate enabling signal to AND gate 115. Every time an incorrect answer is given, switch means 89 is set to close gate 115. The signal on lead 100 is also applied, via OR gate 107 and output lead 108, to the OFF terminal of switch means 111 which turns off answer panel light 113 and to the ON terminal of switch means 85 which turns on tape drive 70 so that tape transport 64 can proceed to the next question.

In case that the student presses the incorrect response panel button 124, comparator 123 provides a signal on lead 86 which "sets" device 89 thereby closing AND gate 115 so that correct counter 117 cannot be advanced. The signal on 86 is also applied, through OR gate 88 and lead 92 to output leads 99 and 100 in the same manner as that of signal on lead 87. Consequently, the signal on lead 86 likewise resets decoder 80, turns switch means 85 on, turns switch means 111 off, and advances to total counter 119. In other words, on an incorrect signal, the operation of the device of this invention is substantially the same as on a correct signal except that AND gate 117 is closed so that correct counter 117 is not advanced.

Operation of the device of this invention in TEACH MODE NO. 1 obtained by setting switches 90 and 91 to the second position, is as follows. As has been stated heretofore, the primary difference between operating in the TEST MODE and this mode is that in the TEST MODE, tape transport 64 is advanced after every question regardless of whether the answer is correct or incorrect. In the TEACH MODE NO. 1, tape transport 64 only advances after the correct answer is received. Total counter 114 advances every time a new question is asked but correct counter 117 advances only in case of a correct response on the first selection to the question.

The operation of this device in this mode is substantially the same as the one described in connection with the TEST MODE up to the time that panel light 113 lights up to advise the student of the fact that the device is ready to receive his response. In case he gives the correct answer on the first selection a signal is applied, through comparator output line 87, directly to position 2 of both mode switches 90 and 91 just as before. This signal is received by conductors 99 and 100, just as was described in connection with the TEST MODE, resets decoder 80, turns on switch means 85 and thereby transport 64, turns off switch means 111 and thereby answer light 113, and advances both counters 117 and 119.

If the student on his first selection selects the incorrect answer an output signal is provided on comparator line 86 which, because of switches 90 and 91, is not applied to leads 99 and 100. Instead, the output signal is applied to the set terminal of switch means 89 to set the same so that line 93 becomes low which in turn closed AND gate 115 thereby isolating correct counter from any signal that might be applied subsequently to lead 100. Also, switch means 111 remains on thus leaving answer lamp 113 on indicating to the student that he is to answer again.

Nothing else happens from then on and any subsequent incorrect responses made by the student by depressing response panel buttons will have no effect on the system. Until the right answer is selected no signals will be applied to leads 99 and 100 to advance transport 64 to the next question and reset all the other switches in the circuit as well as turn off panel lamp 113. Also, since switch means 89 is in its set position closing gate 115, any subsequent correct answer will only advance total counter 119 but not correct counter 117.

Operation of the device of this invention in TEACH MODE NO. 2 is as follows. As heretofore stated, tape transport 64 restarts every time an answer is made regardless of whether the answer is correct or incorrect. However, instead of proceeding to the next question, special reinforcing material is given the student in case he selected the wrong answer. The coding scheme in connection with utilizing the devices of this invention in TEACH MODE NO. 2 has been explained in connection with the description of FIG. 4B. For operation in this mode, decoder 80 is provided with two additional positions which are position 8 and position 9.

As before, the operation in this mode is identical to the previously explained operation in the other mode up to the time that response panel lamp 113 lights up indicating to the student that the device is ready to receive his answer. If the student selects the correct answer, a signal is applied by comparator 123 to comparator output lead 87. Since switches 90 and 91 are set to the third position to operate in this mode the signal on lead 87 passes through OR gate 88, output lead 92 and through switch 91 to lead 100. No signal passes to lead 99 to initiate a reset.

The signal on lead 100 operates in exactly the same manner as previously described, that is, it advances total counter 119 and correct counter 117 through open AND gate 115. Furthermore, the signal is applied through OR gate 107 to shut off switch means 111 to extinguish panel light 113, and to turn on switch 85 to actuate tape transport drive 70 and to advance tape 67. Tape transport electronics 69 then receives a group of pulses such as 44, FIG. 4B, which advance decoder 80 to the 8th position. The leading edge of the first pulse of code group 44 triggers delay 81 which masks or disables the several decoder output terminals until the end of the delay pulse throughout output lead 82. Also, the delayed pulse is applied to AND gate 83 which, however, remains closed because at the same time output position 80–8 is enabled and since it is high and passes through inverter 105, it provides a disabling signal on lead 106 thereby closing AND gate 83. Accordingly, switch 85 is not turned off by delay 81.

Decoder position 80–8 also applies a gating signal to AND gate 95 which, however, remains closed since the gating signal on lead 94 is low because switch means 89 was not set since the correct answer was given. Accordingly, no enabling signal is passed through OR gate 96 to open AND gate 73. Consequently, reinforcing material 45, FIG. 4B, which is supplied to lead 71, is prevented from reaching speaker 75 by closed AND gate 73 and the student does not hear the reinforcing material.

After tape transport 64 advances and picks up pulse 46, FIG. 4B, decoder 80 is advanced to the 9th position and delay 81 is actuated once more. After the end of the delay period decoder output circuit 80–9 is enabled and high, and passes through inverter 105 to close AND gate 83 so that the delayed pulse on output lead 82 does not turn off switch means 85 and stop tape transport 64. However, position 9 is also connected to OR gate 109 and will reset decoder 80 to return the same to its home or 80–0 position. Thereafter, the next question is automatically asked the student.

If the student selects an incorrect answer on the first response, a signal is applied to lead 86 which immediately sets switch means 89 to close AND gate 115 thereby isolating correct counter 117 until a reset. The signal on lead 86 is also applied to OR gate 88 in the same manner that the signal 87 was applied thereto. Accordingly, the signal on lead 86 will therefore advance the total counter 119, switch off switch means 111 and thereby the response panel lamp 113 and turn on switch 85 to advance tape transport 64 to the group of pulses designated 44 in FIG. 4B.

The operation of this device now continues substantially in the same manner as described hereinabove except that switch means 89 applies an enabling signal to output lead 94 which opens AND gate 95 and, through OR gate 96, applies an enabling signal via lead 98 to open AND gate 73. The only difference therefore is that when the reinforcing material is applied to lead 71 it will pass through open AND gate 73 and be audible through loud speaker 75. As soon as decoder 80 is advanced to its 9th position, it will also apply a reset signal along lead 110 to switch means 89 to reset the same for closing AND gate 95 and opening AND gate 115.

In case it is desired to use a slide projector for demonstrating exhibits illustrating a question, or for providing a visual multiple choice answer, the 9th pulse corresponding to the last decoder position may be used to advance the slide projector. In case of operation in the TEST MODE or TEACH MODE NO. 1, the slide projector need not be triggered every time a new question is presented but may be selectively triggered after some, but not after other questions.

The teaching device of FIG. 3 operates in the same manner when used with the dual track tape 55 of FIG. 2. In that case the audio signal is applied to lead 71 and the code oscillator is applied to lead 77 and filter 76 may be eliminated.

There has been described a new testing and teaching device operable in several different modes and a new method therefor. The teaching device may be used with a record member having both questions and coded answers recorded thereon and can be repeated numerous times. The device is fully automatic and foolproof so that testing and training requires no supervision.

It will be obvious to those skilled in the art that different operating modes may be utilized in practicing the present invention depending on the material taught and the person to be taught in operating the device of this invention in the TEST MODE; it may be found desirable to precede the following question with a statement of the correct answer of the preceding question. In this manner the device in the TEST MODE teaches the person as well since the student has responded to a question he will immediately know the correct answer whether he selected the same or not.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. A recording system suitable for preparing teaching programs upon a record member for playback with a teaching device, said recording system comprising:

microphone means responsive to sound and operative to develop a corresponding audio signal;

filter means responsible to said audio signal and operative to remove from said audio at least a narrow frequency band centered about a selected frequency to provide a filtered audio signal;

a telephone dialer for generating a sequence code pulse of a selected number substantially equal in duration and separation;

oscillator means for providing an oscillator signal at said selected frequency;

gating means responsive to said code pulses for gating said oscillator signal to provide a coded oscillator signal;

mixer means responsive to said filtered audio signal and said coded oscillator signal for combining and amplifying said signals to provide a composite signal; and recording means including a record member and a transducing means, said composite signal being applied to said transducing means for recording upon said record member.

2. A recording system comprising:

sensor means responsive to sound and operative to develop a corresponding audio signal;

filter means to remove from said audio signal at least a narrow band of frequencies centered about a selected frequency;

coding means for generating a sequence of a selected number of short code bursts, each code burst being formed of a signal at said selected frequency and for impressing applied intelligence to the record member. swer to the immediately preceding audio signal; and recording means for sequentially impressing said filtered audio signal and said code bursts upon a record member.

3. A recording system in accordance with claim 2 in which said recording means includes a single transducer for impressing applied intelligence to the record member.

4. A method of recording a teaching program, which includes a verbal question followed by a coded answer, upon a record member for playback with a teaching device, said method comprising the steps of:

transducing the verbal question into an electric audio signal;

removing from said audio signal at least a narrow frequency band centered about a selected frequency to derive a filtered audio signal;

generating a sequence of short bursts of a signal at said selected frequency, the number of bursts in said sequence being a representation of the coded answer to said verbal question; and sequentially applying first said filtered audio signal and thereafter said sequence of bursts to the record member for storage.

5. A method of recording a teaching program upon a record member for use with a teaching device and in which the teaching program includes verbal material for playback to a student and coded material for programming the teaching machine, said method comprising the steps of:

transducing the verbal material into an electric audio signal;

removing from said audio signal at least a narrow frequency band centered about a selected frequency to derive a filtered audio signal;

generating a sequence of pulsed code signals at said selected frequency, the number of code signals in said sequence forming said coded material; and sequentially applying said filtered audio signal and said sequence of code signals to the record member for storage in such a manner that a time interval greater than the duration of a sequence containing the largest possible number of code signals is permitted to elapse after the commencement of the coded material and prior to the recording of further material.

6. A method in accordance with claim 5 in which verbal material representing a question alternates with coded material representing an answer.

7. A method in accordance with claim 5 in which verbal material representing a question is followed with coded material representing a coded answer which in turn is followed by further coded material representing programming material which in turn is followed by reinforcing material representing a verbal answer to the question.

8. A method of recording a teaching program upon a record member for use with a teaching device and in which the teaching program includes verbal material for playback to a student and coded material for programming the teaching machine in response to coded answers supplied by the student, said method comprising the steps of:

converting the verbal material into electric audio signal through a microphone;

filtering the audio signal to remove therefrom at least a narrow frequency band centered about a selected code frequency;

generating a code signal having said selected code frequency;

developing a sequence of gating pulses by means of a serial coding means, the number of gating pulses in a sequence being related to the immediately preceding verbal material the desired program of the teaching machine and the various answers to be supplied by the student;

gating said code signal with said gating pulses to derive a gated code signal; and sequentially recording the filtered audio signal and the gated code signal upon the record member.

9. A method in accordance with claim 8 in which a time interval is provided after the commencement of recording gated code signals, which time interval is greater than the time interval necessary for recording the sequence of the largest possible number of gating pulses, before recording any further material.

10. A method of recording a teaching program upon a record member for use with a teaching device in which the teaching program includes verbal material for playback to a student and coded material for programming the teaching device in response to coded answers supplied by the student, said method comprising the steps of:

converting the verbal material into electric audio signal;

generating a train of predetermined, equally spaced and identical pulses, the number of pulses in said train of pulses being related to the immediately preceding verbal material, the desired program of the teaching machine and the various answers to be supplied by the student;

sequentially recording the audio signal and the train of pulses upon the record member; and providing a minimum selected time interval after the commencement of recording the train of pulses and before recording the next following audio signal which is greater than the time interval necessary for recording a sequence of the largest possible number of pulses in a pulse train.

11. A magnetic record member for use with a teaching device having impressed thereon a teaching program which comprises:

sequentially alternating audio signals and pulse trains; said audio signals representing questions to be propounded to a student and said pulse trains consisting of equispaced, identical pulses;

the number of pulses in such pulse train being related only to the immediately preceding audio signal, the desired program of the teaching device and the various answers to be supplied to the student; and the distance along the length of said record member, between the first pulse of a pulse train and the immediately following audio signal, being greater than a minimum distance which is selected to allow recording a pulse train containing the largest possible number of pulses.

12. A magnetic record member in accordance with claim 11 in which said audio signals and said pulse trains are recorded on different recording tracks.

13. A magnetic record member in accordance with claim 11 in which said audio signals and said pulse trains are recorded on the same track.

14. A magnetic record member in accordance with claim 13 in which said audio signals are filtered to remove therefrom at least a narrow frequency band centered about a code frequency and wherein the pulses of said pulse train consist of bursts of said code frequency.

References Cited

UNITED STATES PATENTS

| | | | |
|---|---|---|---|
| 2,780,679 | 2/1957 | Vandivere | 179—100.1 |
| 3,004,104 | 10/1961 | Hembrooke | 179—2 |
| 3,141,243 | 7/1964 | Chapman et al. | 35—9 |
| 3,280,271 | 10/1966 | Meyer | 179—100.2 |

JEROME SCHNALL, *Primary Examiner.*

EUGENE R. CAPOZIO, *Examiner.*

R. W. WEIG, *Assistant Examiner.*